US012803890B2

(12) United States Patent
Suarez Rodriguez et al.

(10) Patent No.: US 12,803,890 B2
(45) Date of Patent: Nov. 17, 2026

(54) PACKET DETECTION METHODS AND WIRELESS COMMUNICATION DEVICES IN A WIRELESS NETWORK

(71) Applicant: Morse Micro Pty. Ltd., Surry Hills (AU)

(72) Inventors: Antonio Cristo Suarez Rodriguez, Surry Hills (AU); Eyal Mendel, Surry Hills (AU)

(73) Assignee: Morse Micro Pty. Ltd., Surry Hills (AU)

( * ) Notice: Subject to any disclaimer, the term of this patent is extended or adjusted under 35 U.S.C. 154(b) by 31 days.

(21) Appl. No.: 19/090,300

(22) Filed: Mar. 25, 2025

(65) Prior Publication Data

US 2025/0373525 A1 Dec. 4, 2025

(30) Foreign Application Priority Data

May 28, 2024 (AU) ................................ 2024901581

(51) Int. Cl.

*H04L 43/026* (2022.01)
*H04L 5/00* (2006.01)
*H04L 43/022* (2022.01)
*H04W 24/10* (2009.01)

(52) U.S. Cl.

CPC .......... *H04L 43/026* (2013.01); *H04L 5/0048* (2013.01); *H04L 43/022* (2013.01); *H04W 24/10* (2013.01)

(58) Field of Classification Search

CPC ... H04L 43/026; H04L 43/022; H04L 5/0048; H04W 24/10

See application file for complete search history.

(56) References Cited

U.S. PATENT DOCUMENTS

| | | | | |
|---|---|---|---|---|
| 8,175,134 | B1 * | 5/2012 | Giallorenzi | H04B 1/713 375/139 |
| 11,683,751 | B2 * | 6/2023 | Kenney | H04L 27/2613 370/311 |
| 2015/0282055 | A1 * | 10/2015 | Pu | H04L 27/2659 455/434 |
| 2017/0338942 | A1 * | 11/2017 | Stanciu | H04B 1/709 |
| 2018/0014216 | A1 * | 1/2018 | Banerjea | H04L 27/2602 |
| 2018/0103431 | A1 * | 4/2018 | Suh | H04B 1/707 |
| 2018/0152334 | A1 * | 5/2018 | Thiagarajan | H04L 27/12 |
| 2018/0376370 | A1 * | 12/2018 | Shellhammer | H04L 27/2613 |
| 2022/0329376 | A1 * | 10/2022 | Kim | H04L 5/0048 |
| 2024/0214958 | A1 * | 6/2024 | Mohammed | H04L 7/033 |

* cited by examiner

*Primary Examiner* — Nam T Tran
(74) *Attorney, Agent, or Firm* — Polsinelli PC

(57) ABSTRACT

Methods and wireless communication devices for packet detection include configuring the wireless communication device to receive a wireless signal according to a current operating bandwidth and a primary channel index, generating a centred kernel from a stored correlator according to the current operating bandwidth, generating non-centred kernels from the centred kernel by frequency shifting according to the current operating bandwidth and the primary channel index, correlating a portion of the received wireless signal with one or a combination of the generated centred and non-centred kernels to determine a packet detection result, and processing the received wireless signal according to the packet detection result.

20 Claims, 3 Drawing Sheets

| (I, Q) | 0 | pi/8 | pi/4 | 3pi/8 | pi/2 | 5pi/8 | 3pi/4 | 7pi/8 | pi | 9pi/8 | 5pi/4 | 11pi/8 | 3pi/2 | 13pi/8 | 7pi/4 | 15pi/8 |
|---|---|---|---|---|---|---|---|---|---|---|---|---|---|---|---|---|
| (0, 1) | | | (-1, 1) | | | | (-1,-1) | | | | (1,-1) | | | | (1, 1) | |
| (0, -1) | | | (1, -1) | | | | (1, 1) | | | | (-1, 1) | | | | (-1,-1) | |
| (1, 0) | | | (1, 1) | | | | (-1, 1) | | | | (-1,-1) | | | | (1,-1) | |
| (1, 1) | (I, Q) | | (0, 1) | (-Q, I) | | | (-1, 0) | (-I, -Q) | | | (0,-1) | (Q, -I) | | | (1, 0) | (I,Q) |
| (1, -1) | | | (1, 0) | | | | (0, 1) | | | | (-1, 0) | | | | (0,-1) | |
| (-1, 0) | | | (-1,-1) | | | | (1,-1) | | | | (1, 1) | | | | (-1, 1) | |
| (-1, 1) | | | (-1, 0) | | | | (0,-1) | | | | (1, 0) | | | | (0, 1) | |
| (-1, -1) | | | (0,-1) | | | | (1, 0) | | | | (0, 1) | | | | (-1, 0) | |

PACKET DETECTION METHODS AND WIRELESS COMMUNICATION DEVICES IN A WIRELESS NETWORK

CROSS-REFERENCE TO RELATED APPLICATION

The present application claims priority from Australian provisional patent application number 2024901581 filed on 28 May 2024, the contents of which are incorporated herein by cross-reference.

FIELD OF THE INVENTION

The present disclosure generally relates to wireless communications. Specifically, aspects of the present disclosure are related to digital processing for wireless transmission.

BACKGROUND

A wireless communication network, such as a Wireless Local Area Network (WLAN), operates in compliance with one or more IEEE 802.11 wireless protocol standards, typically includes multiple wireless communication devices. A Basic Service Set (BSS) in a wireless communication network includes at least an Access Point (AP) communicating with one or more Stations (STAs). The AP of the wireless communication network may be coupled to another network, such as the Internet, and may enable STAs to communicate bi-directionally or enable a STA to communicate with other devices in the network through the AP. Transmitters typically prepend preambles to the data payload. These preambles help intended receivers detect incoming signals and establish initial synchronization. Designed with repeated symbol patterns that exhibit strong correlation properties, preambles allow the receiver to easily identify the start of a packet. Once a signal is received, the receiver converts it into a stream of discrete-time complex baseband samples. It then applies correlation-based algorithms to detect the initial samples of each incoming packet. The initial synchronization process generally consists of packet detection, sampling time offset estimation, and Carrier Frequency Offset (CFO) estimation.

For a 1 MHz packet structure compliant with the IEEE 802.11ah standard, also known as Wi-Fi HaLow, the preamble consists of 14 Orthogonal Frequency Division Multiplexing (OFDM) symbols. Each OFDM symbol contains N=32 subcarriers spaced 31.25 KHz apart in the frequency domain. In the time domain, a cyclic prefix of 8 microseconds extends each OFDM symbol to a total duration of 40 microseconds.

The preamble is structured into three key fields: Short Training Field (STF), Long Training Field 1 (LTF1), and Signal Field (SIG). For a 1 MHz channel bandwidth, STF consists of 4 OFDM symbols, which represents 20 repetitions of the same 8 microsecond long short training symbol in the time domain. For other channel bandwidth, such as 2, 4, or 8 MHz, STF consists of 2 OFDM symbols, which represents 10 repetitions of the same 8 microseconds. STF is typically used for coarse timing synchronization, coarse CFO estimation, and Automatic Gain Control (AGC). LTF1 also contains 4 OFDM symbols of 160 microsecond duration for 1 MHz bandwidth or 2 OFDM symbols of 80 microsecond duration for 2, 4, or 8 MHz bandwidth. LTF1 contains two repetitions of the same long training symbol enabling fine timing synchronization, CFO estimation, and channel estimation. SIG contains essential packet information used to configure the receiver. Additionally, an extra Long Training Field 2 (LTF2) is included in the preamble for Multiple Input Multiple Output (MIMO) channel estimation.

SUMMARY

The following summary presents technical features relating to one or more aspects of low-cost kernel implementation for packet detection disclosed herein and should not be considered as an extensive overview relating to all contemplated aspects. Accordingly, the following summary has the sole purpose to present certain concepts relating to one or more embodiments relating to packet detection disclosed herein in a simplified form to precede the detailed description presented below.

Disclosed are packet detection methods performed by a wireless communication device communicating in a wireless network. Some embodiments of the packet detection method include configuring the wireless communication device to receive a wireless signal according to a current operating bandwidth and a primary channel index, generating at least a centred kernel from at least a stored correlator according to the current operating bandwidth, generating non-centred kernels from the centred kernel by frequency shifting according to the current operating bandwidth and the primary channel index, correlating at least a portion of the received wireless signal with one or a combination of the generated centred and non-centred kernels to determine a packet detection result, and processing the received wireless signal according to the packet detection result. An embodiment of the stored correlator is a pre-stored base kernel.

In some embodiments of the present invention, the stored correlator comprises one or a combination of a 1 in 8 centred kernel, a 2 in 8 centred kernel, a 4 in 8 centred kernel, and an 8 in 8 centred kernel. The step of generating the centred kernel includes downsampling the 1 in 8 centred kernel to generate a 1 in 4 centred kernel, a 1 in 2 centred kernel, or a 1 in 1 centred kernel, or downsampling the 2 in 8 centred kernel to generate a 2 in 4 centred kernel or a 2 in 2 centred kernel, or downsampling the 4 in 8 centred kernel to generate a 4 in 4 centred kernel. An embodiment of the current operating bandwidth is 1 MHz, the step of generating a centred kernel includes downsampling the 1 in 8 centred kernel to generate a 1 in 1 centred kernel, and the packet detection result is determined by correlating at least a portion of the received wireless signal with the 1 in 1 centred kernel. An embodiment of the current operating bandwidth is 2 MHz, the step of generating at least a centred kernel includes downsampling the 1 in 8 centred kernel and downsampling the 2 in 8 centred kernel to generate a 1 in 2 centred kernel and a 2 in 2 centred kernel, and generating non-centred kernel includes frequency shifting the 1 in 2 centred kernel to generate two 1 in 2 non-centred kernels. The packet detection result is determined by correlating at least a portion of the received wireless signal with the two 1 in 2 non-centred kernels and the 2 in 2 centred kernel. An embodiment of the current operating bandwidth is 4 MHz, the step of generating at least a centred kernel includes downsampling the 1 in 8 centred kernel, 2 in 8 centred kernel, and 4 in 8 centred kernel to generate a 1 in 4 centred kernel, 2 in 4 centred kernel, and 4 in 4 centred kernel. The step of generating non-centred kernels includes frequency shifting the 1 in 4 centred kernel and 2 in 4 centred kernel to generate four 1 in 4 non-centred kernels and two 2 in 4 non-centred kernels. The packet detection result is determined by correlating at least a portion of the received wireless signal with the four 1 in 4 non-centred kernels, two 2 in 4 non-centred kernels, and the 4 in 4 centred kernel. An embodiment of the current operating bandwidth is 8 MHz, the generated centred kernels include the 1 in 8 centred kernel, 2 in 8 centred kernel, 4 in 8 centred kernel, and 8 in 8 centred kernel. The step of generating non-centred kernels comprises frequency shifting the 1 in 8 centred kernel, 2 in 8 centred kernel, and 4 in 8 centred kernel to generate eight 1 in 8 non-centred kernels, four 2 in 8 non-centred kernels, and two 4 in 8 non-centred kernels. The packet detection result is then determined by correlating at least a portion of the received wireless signal with the eight 1 in 8 non-centred kernels, four 2 in 8 non-centred kernels, two 4 in 8 non-centred kernels, and the 8 in 8 centred kernel.

In some embodiments, the packet detection method comprises sampling the received wireless signal at the current operating bandwidth to generate samples of in-phase (I) and quadrature phase (Q) for packet detection. The step of correlating at least a portion of the received wireless signal comprises cross correlating the samples of in-phase and quadrature phase with one or more of the generated centred and non-centred kernels according to the current operating bandwidth.

The packet detection result is determined by correlating a Short Training Field (STF) of a Physical layer (PHY) preamble in the wireless signal with one or a combination of the generated centred and non-centred kernels. The step of processing the received wireless signal includes performing a Long Training Field (LTF) search when the packet detection result indicates the STF is successfully detected.

Some embodiments of generating at least a centred kernel comprise downsampling or decimating the stored correlator. In an embodiment, the stored correlator is a quantized centred kernel. In some embodiments, generating non-centred kernels from the centred kernel by frequency shifting is implemented by a Look Up Table (LUT). Input values of the LUT represent the centred kernel, output values of the LUT represent each of the non-centred kernel, and the LUT is searched by a column index derived from a counter incremented according to the current operating bandwidth and the primary channel index.

In an aspect of the present invention, a wireless communication device communicating in a wireless network includes at least a Radio Frequency (RF) receiver, a processor, and one or more memory bank communicatively coupled to the processor and storing processor readable codes. The processor executes the codes stored in the memory banks to configure the wireless communication device to receive a wireless signal according to a current operating bandwidth and a primary channel index, generate at least a centred kernel from at least a stored correlator according to the current operating bandwidth, generating non-centred kernels from the centred kernel by frequency shifting according to the current operating bandwidth and the primary channel index, correlating at least a portion of the received wireless signal with one or a combination of the generated centred and non-centred kernels to determine a packet detection result, and processing the received wireless signal according to the packet detection result.

In some embodiments of the wireless communication device, the processor is configured for generating one or more centred kernels by downsampling one or more stored correlators. The memory bank of the wireless communication device stores a LUT, which maps input values to output values based on the primary channel index. The processor is configured for generating non-centred kernels by obtaining input-in-phase (I) and quadrature phase (Q) combinations corresponding to the centred kernel, and searching the LUT to derive output I and Q combinations of the non-centred kernel. In an embodiment of the wireless communication device, the processor configures the hardware and triggers both centred kernel generation and non-centred kernel generation by the hardware. In another embodiment, the processor executes processor readable codes to perform centred kernel generation and non-centred kernel generation in combination with hardware. In an embodiment, the LUT is simplified by incorporating logic for transforming input I and Q combinations to output I and Q combinations corresponding to one or more predetermined phases, and the memory only stores output I and Q combinations corresponding to phases not belong to the predetermined phases. The processor is configured for deriving the output I and Q combinations of the non-centred kernel according to the input I and Q combinations of the centred kernel based on the incorporated logic. In some embodiments, the LUT is searched by a column index derived from a counter incremented according to the current operating bandwidth and the primary channel index.

Other objects and advantages associated with the aspects disclosed herein will be apparent to those skilled in art based on the accompanying drawings and detailed description.

BRIEF DESCRIPTION OF THE DRAWINGS

Illustrative aspects of the present application are described in detail below with reference to the following drawing figures.

DETAILED DESCRIPTION

Figures 1, 2:
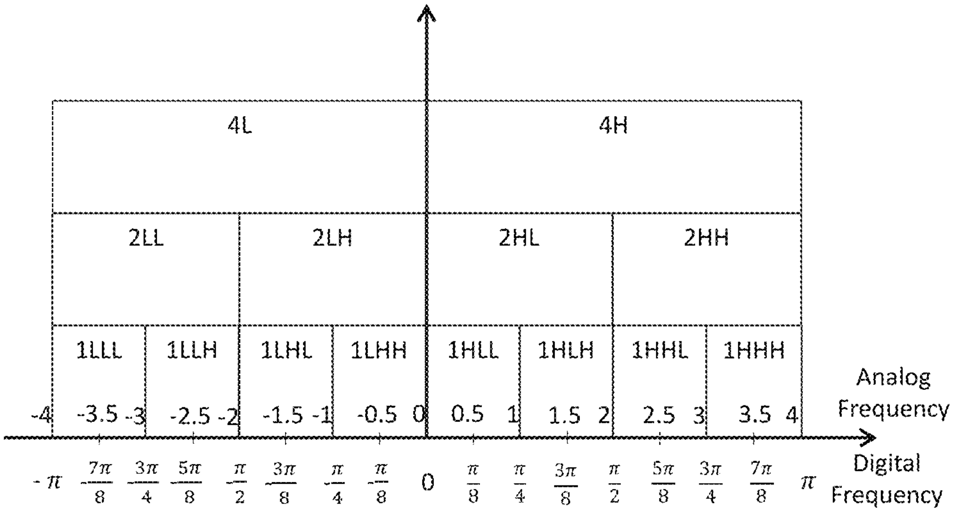
FIG. 1 illustrates 4 MHz, 2 MHz, and 1 MHz sub-bands in an 8 MHz baseband spectrum.
FIG. 2 illustrates an example of a simplified LUT for frequency shifting according to an embodiment of the present invention.

Certain aspects and embodiments of this disclosure are provided below. Some of these embodiments may be applied independently and some of them may be applied in conjunction as would be apparent to those of skill in the art. In the following description, for the purposes of explanation, specific details are set forth to provide a thorough understanding of aspects of the application. However, it will be apparent that various embodiments may be practiced without these specific details. The figures and description are not intended to be restrictive. The following description of the embodiments will provide those skilled in the art with an enabling description for implementing an example aspect. Changes may be made in the function and arrangement of elements without departing from the spirit and scope of the application as set forth in the claims.

In some embodiments, the AP periodically broadcasts beacon frames to allow STAs within the BSS coverage area to associate with the AP, establish a communication link, or maintain timing synchronization. STAs may also be configured to periodically scan their surroundings for alternative APs with superior network conditions, such as higher Received Signal Strength Indicator (RSSI) or lower traffic load.

Embodiments of an AP or a STA consist of a Radio Frequency (RF) transmitter, an RF receiver, an antenna, memory banks, input and output interfaces, a communication bus, a Medium Access Control (MAC) processor, a Physical layer (PHY) processor, and a HOST processor. The memory banks store software or computer readable instructions that can be executed by the processors to implement functions of the respective communication/application layer. The PHY processor manages the interface with the wireless medium by exchanging digital samples with the RF transmitter and RF receiver. The MAC processor coordinates wireless medium access by executing MAC-level instructions to manage the interface between the application software and the wireless medium, through the PHY processor. For example, the key functions of the MAC processor include adding header and tail bytes to the data payload provided by the higher layer before passing the data payload to the PHY layer for transmission. The reverse happens when the MAC processor handling received data by extracting the payload from the PHY layer and delivering to the higher layer. The MAC processor is also responsible for managing retransmission when a frame is received with error. The HOST processor interfaces with the MAC layer and is responsible for executing higher-level functionalities of the wireless communication device.

For an IEEE 802.11ah AP to initiate a BSS supporting 8 MHz transmission, the operating bandwidth is configured as an 8 MHz-wide channel which can be divided into a 4 MHz primary channel and a 4 MHz secondary channel. The 4 MHz primary channel can further subdivide into a 2 MHz primary channel and a 2 MHz secondary channel. The 2 MHz primary channel can similarly divide into a 1 MHz primary channel and a 1 MHz secondary channel. In each case, the smaller primary channel (e.g. 1 MHz primary channel) can be positioned in either the lower or upper subchannel of the larger primary channel (e.g. 2 MHz primary channel). The BSS is configured with either a 1 MHz or 2 MHz primary channel, which is used for transmission of beacon frames and other management frames. The BSS is also configured with an operating bandwidth which may be wider than the primary channel. For example, in a BSS configured with a 4 MHz or 8 MHz operating channel, all management frames are transmitted in a subchannel, either a 1 MHz or 2 MHz primary channel.

In a BSS supporting an 8 MHz operating bandwidth, packets may be transmitted by the AP or STA on 1, 2, 4, and 8 MHz primary channels, in a non-duplicate format, or in 1 MHz or 2 MHz duplicate format. A duplicate mode refers to a transmission mode used to improve reception reliability by duplicating data across multiple subchannels simultaneously. Direct data packets are typically sent at the highest rate and widest bandwidth depending on the capabilities of the individual STA. In IEEE 802.11ah, an AP or STA performs full Physical layer (PHY) processing including energy detection, packet detection and decoding on the 1, 2, 4, and 8 MHz primary channels, as well as partial processing including energy detection and packet detection on the 1, 2, and 4 MHz secondary channels.

The APs and STAs transmit and receive data in the form of PHY layer Protocol Data Units (PPDUs). A PPDU is a composite structure that consists of a PHY preamble and a payload, where the PHY preamble contains information that may be used by a receiving wireless communication device to decode the subsequent data. The preamble typically includes information for packet detection, Automatic Gain Control (AGC), and channel estimation. For example, IEEE 802.11ah standard supports three preamble types, including S1G_SHORT, S1G_LONG, and S1G_1M. The first field of all three preamble types is Short Training Field (STF) which exhibits periodic structure in both time and frequency domains. The length and the periodicity of the STF vary based on the preamble type and the Operating Bandwidth (OBW). For low signal levels or complex modulation schemes, accurate packet detection, timing and frequency estimation are necessary to meet receiver sensitivity specifications. These processes heavily rely on identifying and locking onto the STF and Long Training Field (LTF). The STF is primarily used for coarse time synchronization, AGC adjustment, and coarse frequency synchronization. The LTF is used for fine frequency synchronization, channel estimation, and Multiple Input Multiple Output (MIMO) calibration. Each of the STF and LTF contains a known repetitive pattern, where STF has a shorter duration and higher repetition compared to LTF. The STA receives a wireless signal and applies a correlation operation between the received signal with a known reference signal, which is called a kernel that is used to identify the presence of a transmitted packet. For example, the STA contains a Golay sequence, so the kernel used for STF detection is a stored Golay complementary sequence. For example, the STA performs STF acquisition by correlating the received signal with one or more STF kernels, and LTF acquisition by correlating the received signal with one or more LTF kernels. In some embodiments, each STF kernel is 8 microsecond (us) long while the length of each LTF kernel can be variable, both sampled at the operating bandwidth and quantized to 2 bit using optimal scaling. These kernels are cross-correlated with the incoming In-phase/Quadrature phase (I/Q) data of the received signal that was also sampled at the operating bandwidth. A bank of cross-correlators configured as matched filters for different sub-bands within the operating bandwidth can be used for packet detection. This approach enhances detection reliability under various conditions. For improved efficiency, it is beneficial to enhance the configurability of the STF correlator bank. Specifically, allowing the STF correlators to be cascaded and reused can lead to reduced power consumption and lower memory requirements. This optimization is particularly valuable in low-power wireless communication scenarios, such as IoT applications based on the IEEE 802.11ah standard. Possible transmitter and receiver scenarios when the receivers are configured with arbitrary operating bandwidth are summarized in Table 1.

TABLE 1

| Channel | Operating Bandwidth | | | |
|---|---|---|---|---|
| Bandwidth | 1 MHz | 2 MHz | 4 MHz | 8 MHz |
| 1 MHz | 1P | 1L 1H | 1LL, 1LH, 1HL, 1HH | 1LLL, 1LLH, 1LHL, 1LHH, 1HLL, 1HLH, 1HHL, 1HHH |
| 2 MHz | X | 2P | 2L, 2H | 2LL, 2LH, 2HL, 2HH |
| 4 MHz | X | X | 4P | 4L, 4H |
| 8 MHz | X | X | X | 8P |
| Number of correlators | 1 | 3 | 7 | 15 |

In Table 1, the top row represents the operating bandwidth, while the left column represents the channel bandwidth of each channel used for packet transmission. The table illustrates the channels available for packet transmission in different operating bandwidth scenarios and the number of STF correlators/kernels required for packet detection at each operating bandwidth. For transmission on a 1 MHz channel, the entire 1 MHz channel (1P) is used when the operating bandwidth is only 1 MHz. When the operating bandwidth is expanded to 2 MHz, packets are received on one of the two channels (1L or 1H). When the operating bandwidth is 4 MHz, packets transmitted on a 1 MHz channel are received on one of the four channels (1LL, 1LH, 1HL, or 1HH), and for an 8 MHz operating bandwidth, packets are received on one of eight channels (1LLL, 1LLH, 1LHL, 1LHH, 1HLL, 1HLH, 1HHL, or 1HHH). The first digit of each channel index indicates the bandwidth, P represents primary, L represents low, and H represents high. Those channels are listed from the lowest to the highest frequency. For packets transmitted on a 2 MHz channel, the entire 2 MHz channel (2P) is used when the operating bandwidth is 2 MHz. When the operating bandwidth is 4 MHz, packets are received on either 2L or 2H. When the operating bandwidth reaches 8 MHz, packets are received on one of four channels (2LL, 2LH, 2HL, or 2HH). For a 4 MHz channel transmission, when the operating bandwidth is 4 MHZ, packets are received on the entire 4 MHz channel (4P), if the operating bandwidth is 8 MHz, packets are received on either 4L or 4H channel. For packet transmission on an 8 MHz channel, the entire 8 MHz operating bandwidth (8P) is used. The receiver only requires 1 correlator for packet detection when it is detecting packets sent within the 1 MHz operating bandwidth and it requires 3 correlators when a 2 MHz operating bandwidth is used. The number of STF correlators required for packet detection increased to 7 or 15 when the operating bandwidth is 4 MHz or 8 MHz respectively.

An aspect of the reduced cost kernel implementation for packet detection stores one or more correlators corresponding to centred versions of kernels and derives remaining centred versions of kernels by downsampling or decimating the stored kernels. In some embodiments, the STF kernel derivation method for packet detection includes deriving one or more centred versions of STF kernel by downsampling a centred version of the X in 8 STF kernel, where X is 1, 2, 4, or 8. Sub-band packets are signal transmission confined within a subset of the available operating bandwidth, for example, the sub-band packets are transmitted in a channel with a channel bandwidth of 1 MHZ, 2 MHz, or 4 MHz within a 8 MHz operating bandwidth. To generate sub-band packets, relevant non-zero frequency components are inserted, while the remaining bins are zero-padded. Consequently, specific subcarriers within the frequency spectrum contain meaningful data while unused subcarriers remain empty. In certain implementations, the primary channel baseband signal is interpolated to a wider operating bandwidth, enabling decimation in the time domain to recover the original primary channel baseband signal. This bandwidth adaptation ensures compatibility with different channel bandwidths used for packet transmission. For example, a 1 in 8 STF centred kernel is downsampled to derive 1 in 4, 1 in 2, and 1 in 1 STF centred kernels. In another example, a 2 in 8 STF centred kernel is downsampled to derive 2 in 4 and 2 in 2 STF centred kernels. Similarly, a 4 in 8 STF centred kernel is downsampled to drive the 4 in 4 STF centred kernel. Both real and imaginary parts of a STF centred kernel (e.g. X in 4) can be easily derived by downsampling the corresponding real and imaginary parts of an X in 8 STF centred kernel. In some embodiments, an X in 8 STF centred kernel is quantized before downsampling, where real and imaginary parts of a STF centred kernel are derived from downsampling corresponding real and imaginary parts of the quantized version of the X in 8 STF centred kernel.

Another aspect of the reduced cost kernel implementation for packet detection generates or stores one or more quantized centred versions of the STF kernel and derives sub-band versions of the STF kernels by frequency shifting the generated and/or stored centred kernels. Some embodiments of the kernel derivation method for packet detection include deriving one or more sub-band versions of the STF kernels by frequency shifting a quantized centred version of a STF kernel. For example, sub-band versions of 1 in 8 STF kernels are generated by frequency shifting a quantized centred version of a 1 in 8 STF kernel. Similarly, sub-band versions of 2 in 8 STF kernels are derived by frequency shifting a quantized centred version of a 2 in 8 STF kernel, sub-band versions of 4 in 8 STF kernels are derived by frequency shifting a quantized centred version of a 4 in 8 STF kernel.

This sub-band kernel derives from quantized centred kernel is evident for the full-precision case. FIG. 1 illustrates various 4 MHz, 2 MHZ, and 1 MHz sub-bands in an 8 MHz baseband spectrum. The horizontal axis represents the frequency range of each sub-band, where the upper figure indicates the analog frequency in units of MHz and the lower figure indicates the digital frequency. There are eight 1 MHz sub-bands within the 8 MHz spectrum, including 1LLL, 1LLH, 1LHL, 1LHH, 1HLL, 1HLH, 1HHL, and 1HHH, from lower to higher frequency channels. Four 2 MHz sub-bands include 2LL, 2LH, 2HL, and 2 HH, and two 4 MHz sub-bands including 4L and 4H are available for data transmission. Those sub-band kernels are also referred to as non-centred kernels in this description. In one embodiment, the sub-band kernel for the 1 MHz sub-band 1LLL is derived from a 1 in 8 centred kernel by frequency shifting from 0 to −3.5 MHz. This sub-band 1LLL is the most extreme case as the sub-band kernel is derived by frequency shifting 3.5 MHz from the centred version of the 1 in 8 kernel. In another embodiment, the sub-band kernel for the 1 MHz sub-band 1LHH is derived from the 1 in 8 centered kernel by frequency shifting from 0 to −0.5 MHz, where this sub-band 1LHH is the mildest case as the shifted kernel is only 500 KHz away from the centred version of the 1 in 8 kernel. In some embodiments, the centred kernels are quantized in 2-bit format with only 3 different values: −1, 0, and +1. After the required frequency shifts for a given sub-band, each rail of the I and Q components of the sub-band kernel is quantized to maintain the 2-bit format. In one embodiment, the sub-band kernel is generated by frequency shifting the centred version of the kernel. An exemplary quantizer function used for thresholding the sub-band kernel is as follows:

Q(x)=0 if |x|<0.5, otherwise Q(x)=sign (x).

Due to the nature of the sub-bands, for a signal centred at the baseband frequency, the frequency shift required to place the sub-band kernel into any sub-band has the following form:

$$\exp\int_{F_s=8MHz}^{f_0=k*500KHz}\left\{j2\pi\frac{f_0}{F_s}t\right\}=\exp\int_{t=nT_s=n}j\frac{k\pi}{8}t=\cos\left\{\frac{k\pi}{8}n\right\}+j\sin\left\{\frac{k\pi}{8}n\right\};$$

where k is set to the following values:

for 1 in 8 sub-bands: k=1, 3, 5, 7;

for 2 in 8 sub-bands: k=2, 6; and for 4 in 8 sub-bands: k=4.

In some embodiments, the frequency shifter for shifting the centred version of the sub-band kernel is implemented by a lookup table (LUT), such as a quarter sine-wave LUT. In general, such table is implemented with a power-of-two number of points. In some embodiments of the LUT, 5 phases are used to represent the range between 0 to $\pi/2$ exactly. The phases are 0, 22.5, 45, 67.5, and 90 degrees, corresponding to 0, $\pi/8$, $\pi/4$, $3\pi/8$, and $\pi/2$ radians respectively.

As a starting point of creating a quarter sine-wave LUT for approximating various sub-band kernels, values corresponding to the 5 phases are extracted from a sine LUT, and some bits may be dropped to implement the frequency shifter based on the required degree of precision. For example, 4 bits are used to represent mantissa, plus 1 bit for the sign and another bit for the integer part. Entries of the LUT for approximating the quantized sub-band kernels can then be determined.

In some embodiments, instead of performing a frequency shifting operation that is usually done by complex multiplications, and a quantizing operation that is normally done by thresholding, these two operations are combined and replaced by searching up a LUT. The dimension of an exemplary LUT is 8*16*2 as there are 8 different in-phase (I) and quadrature (Q) combinations (I, Q) for a 2-bit format kernel, and there are 16 different phases for the real and imaginary rails. The 8 unique (I, Q) combinations include (0,1), (0, −1), (1,0), (1, 1), (1, −1), (−1, 0), (−1, 1), and (−1, −1). Those 16 phases are $\pi/8$ apart from each other within the range 0 to 2 $\pi$. Note that the case (I, Q)=(0,0) is redundant.

In some embodiments, the LUT for frequency shifting is simplified for implementation to reduce the amount of data stored in the memory. The simplification is achieved by storing only necessary phase mappings, rather than storing all possible phase shifts. By incorporating logic to derive certain phase shifts dynamically, the memory storage requirement can be reduced. A series of patterns or logic can be identified by having a closer inspection to the original LUT. For example, some outputs equal to the inputs, some outputs equal to swapping the input I and Q rails and negating/inverting the I rail. Some outputs are equal to negating the inputs, and some outputs equal to swapping the input I and Q rails and inverting the Q rail. An example of a simplified LUT is shown in FIG. 2. The left most column is the input (I, Q) while the remaining columns show the outputs of the LUT for corresponding phases shown in the first row. For phases of 0, $\pi/8$, and $15\pi/8$, the LUT output is equal to the LUT input, that is, an input of (I, Q) results in output of (I, Q). The memory required to store this LUT can be reduced, as entries corresponding to various inputs for those specific phases are identical to the inputs themselves. For phases of $3\pi/8$, $\pi/2$, and $5\pi/8$, the output of the LUT is just swapping the two input rails and negating the I rail. Specifically, an input of (I, Q) results in an output of (−Q, I). For phases $7\pi/8$, $\pi$, and $9\pi/8$, the output of the LUT is derived by negating both the rails of the input, that is an input of (I, Q) becomes an output of (−I,−Q). For phases $11\pi/8$, $3\pi/2$, and $13\pi/8$, the output of the LUT is derived by swapping the two rails of the input and negating the Q rail. Specifically, an input of (I, Q) results in a LUT output of (Q, −I). These findings may compress the original LUT down to 8 (IQ combinations) *4 (stored values) *2 (real and imaginary) as only 4 stored values are needed for the 16 phases, and the rest of the columns in the LUT can be implemented with logic. The outputs corresponding to these predetermined phases are computed using logic-based transformations instead of fetching them from memory. The LUT only stored the outputs for phases that cannot be derived efficiently via logic. In this embodiment, a non-centred kernel is derived from the centred kernel using the simplified LUT and transformation logic. As shown in Table 1, the number of kernels required for a 1 MHz operating bandwidth is 1, for a 2 MHz operating bandwidth is 3, for a 4 MHz operating bandwidth is 7, and for an 8 MHz operating bandwidth is 15. The size in bytes of the kernels implemented by a LUT is originally 8 (for 1 MHz)+3*16 (for 2 MHz)+7*32 (for 4 MHz)+15*64 (8 MHz)=1304 bytes. By implementing both downsampling from a centred kernel to derive remaining centred kernels and frequency shifting for sub-band kernels, the size of the kernels is just 64 (for the 1 in 8 centred kernel)+64 (for the 2 in 8 centred kernel)+64 (for the 4 in 8 centred kernel)+64 (for the 8 in 8 centred kernel)=256 bytes, which is about 80% of memory reduction. By further forcing all kernels to be in 2-bit format, the required storage for the kernels can be halved, as the size is 32 (for the 1 in 8 centred kernel)+32 (for the 2 in 8 centred kernel)+32 (for the 4 in 8 centred kernel)+32 (for the 8 in 8 centred kernel)=128 bytes, that is about 90% of memory reduction compared to the original kernel implementation using LUTs.

Figure 3:
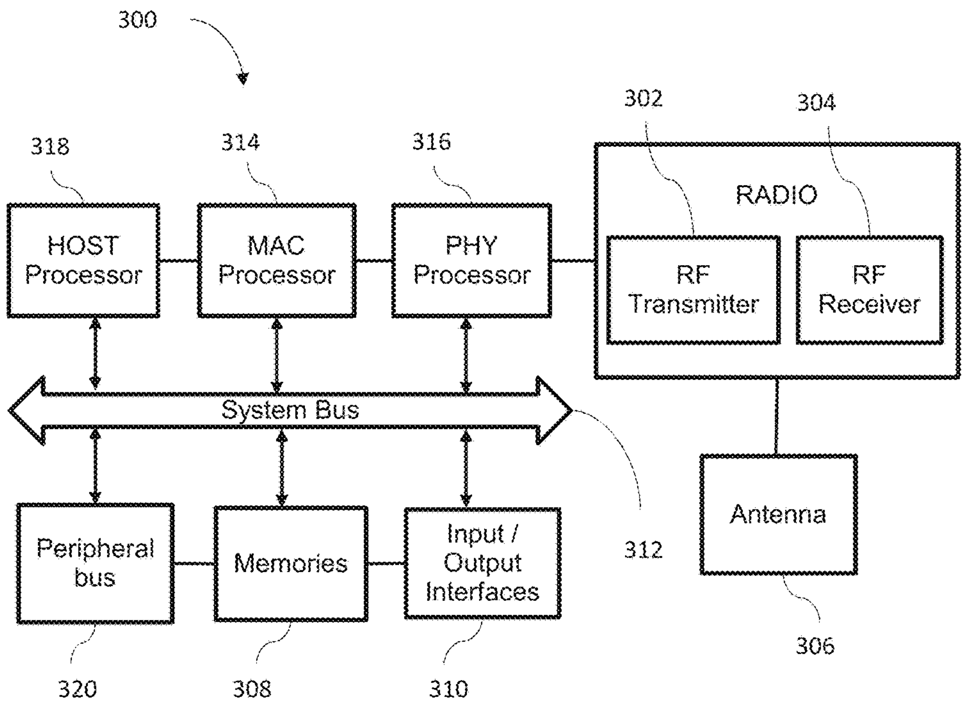
FIG. 3 is an exemplary chip block diagram of a wireless communication device that can be a station (STA) or Access Point (AP) complying with one or more IEEE 802.11 (Wi-Fi) standards.

FIG. 3 shows a high-level block diagram of a wireless communication device 300 that can be used to implement embodiments of the reduced cost packet detection methods. The wireless communication device 300 manages a Medium Access Control (MAC) layer and a Physical (PHY) layer in compliance with an IEEE 802.11 standard. The wireless communication device 300 is a Station (STA) or an Access Point (AP) of a wireless network. For example, the wireless communication device 300 can be included in a mobile device, a personal computer, a laptop computer, an Internet of Things (IoT) device, a wearable device, an extended reality device, a video server, a camera, or a communication device on a vehicle. The wireless communication device 300 includes an RF transmitter module 302, an RF receiver module 304, an antenna unit 306, one or more memory banks 308, input and output interfaces 310 and communication bus 312. The RF transmitter module 302 and the RF receiver module 304 are also known as an RF transceiver, or a modem (modulator-demodulator), which transmits frames by modulating one or more carrier wave signals to encoded digital information, as well as receives frames by demodulating the signal to reconstruct the original digital information. Furthermore, the wireless communication device 300 includes a MAC processor 314, a PHY processor 316, and a HOST processor 318. These processors can be realized by any type of Integrated Circuit (IC) such as a General Processing Unit (GPU), an Application Specific Integrated Circuit (ASIC), or Reduced Instruction Set Computer—Five (RISC-V) based ICs, amongst others. Memory banks 308 store software codes for the processors of the wireless communication device 300. Each processor executes software to implement the functions of the respective communication or application layer. The PHY processor 316 includes a transmitting signal processing unit and a receiving signal processing unit and manages the interface with the wireless medium. The PHY processor 316 operates on PPDUs by exchanging digital samples with the radio module which comprises the RF transmitter 302, Digital-to-Analog Converters (DACs), the RF receiver 304, Analog-to-Digital Converters (ADCs) and digital filters. The MAC processor 314 executes MAC level instructions and manages the interface between the application software and the wireless medium, through the PHY processor 316. The MAC processor 314 is responsible for coordinating access to the wireless medium so that the AP and STAs in range can communicate effectively. The MAC processor 314 adds header and tail bytes to units of data provided by the higher levels and sends them to the PHY layer for transmission. The reverse happens when receiving data from the PHY layer. If a wireless frame is received in error, the MAC processor 314 manages the retransmission of the wireless frame. The HOST processor 318 interfaces with the MAC layer and is responsible for running high level functionalities of the wireless communication device 300.

The peripheral bus 320 connects to a number of peripherals that support core functions of the wireless communication device 300, these peripherals may include timers, interrupts, radio/filters/system registers, counters, Universal Asynchronous Receiver-Transmitter (UART), General Purpose Input Output (GPIO) interfaces and others. The PHY processor 316, the MAC processor 314, the HOST processor 318, the peripheral bus 320, memory banks 308 and input/output interfaces 310, communicate with each other via the system bus 312. Memory banks 308 may further store an operating system and applications. In some embodiments, memory banks 308 store one or more centred versions of kernels used for derivation of remaining centred versions of kernels for packet detection. In some other embodiments, memory banks 308 store the LUT used for generating sub-band kernels for packet detection. The input/output interface unit 310 allows for the exchange of information with a user. The antenna unit 306 may include a single antenna or multiple antennas.

Figure 4:
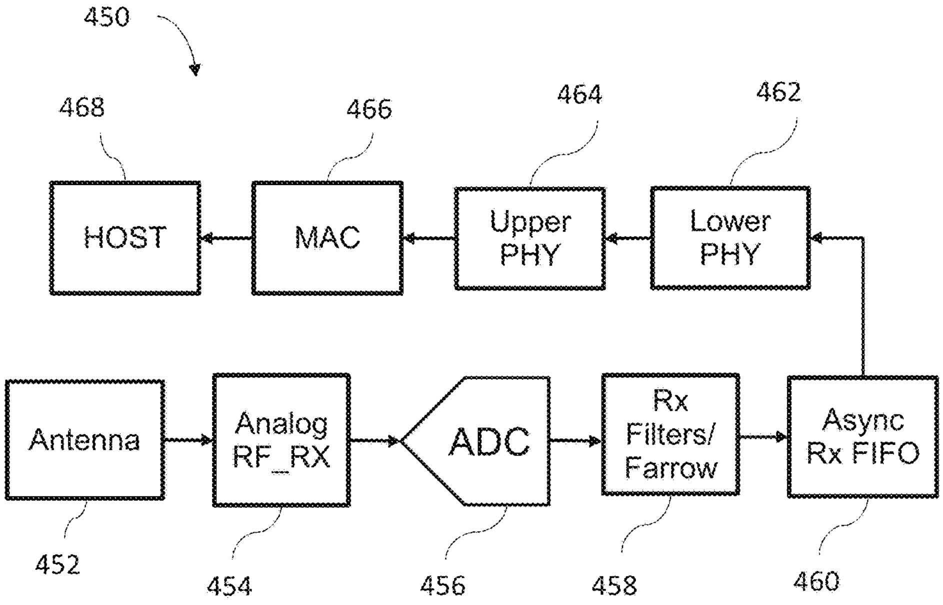
FIG. 4 is a schematic block diagram of a receiver data flow architecture in the wireless communication device of FIG. 3 for receiving wireless signals over a wireless medium.

FIG. 4 illustrates a schematic block diagram of a receiver data flow architecture 450 that can be used to receive wireless signals carrying frames over the wireless medium. In one illustrative embodiment, the receiver data flow architecture 450 illustrated in FIG. 4 corresponds to or otherwise be associated with the wireless communication device 300 illustrated in FIG. 3. In some embodiments, wireless signals are received over the wireless medium and transformed into electrical Radio Frequency (RF) signals by a receiving antenna 452. A RF receiver front-end 454 receives an electrical RF signal carrying Wi-Fi frames. The RF receiver front-end 454 may contain a Low Noise Amplifier (LNA), a mixer for down converting the RF signal to an Intermediate Frequency (IF) or baseband signal based on a Local Oscillator (LO) signal, and a Trans-Impedance Amplifier (TIA). An Analog-to-Digital Converter (ADC) 456 coupled to the RF receiver front-end 454 transforms the baseband signal from analog to digital. The output of the ADC 456 is connected to a receiver down-sampling chain 458 (Rx Filters/Farrow), samples are then collected in an asynchronous receiving First In First Out (FIFO) structure 460. These samples in the asynchronous receiving FIFO structure can be accessed by a packet detect module and a sub-band module, both of which may be included in a lower-level PHY module 462. The packet detect module includes hardware and/or implement algorithms that can be used to analyze the preamble of the PHY Protocol Data Unit (PPDU) in the time domain. In some embodiments of the present invention, the packet detect module uses the reduced cost kernel implementation for packet detection. Some embodiments of the reduced cost kernel implementation downsample a centred version of the kernel to derive one or more remaining centred versions of the kernel. Some embodiments of the reduced cost kernel implementation frequency shift a sub-band kernel to derive one or more sub-band kernels, for example, multiple non-centred sub-band kernels are derived from a centred sub-band kernel. The frequency-shifting is realized by searching a LUT stored in memory according to some embodiments. The packet detect module correlates the received signal with the kernels corresponding to the current operating bandwidth. Upon successful packet detection, the packet detect module recognizes a received IEEE 802.11 frame and synchronizes the frequency and timing of the wireless communication device with the frame being received. The sub-band module within the lower-level PHY module 462 includes hardware and/or implement algorithms that can be used to detect which subchannel in the allocated frequency band is being used for the packet being received. Once a packet is detected and the relevant subchannel is established, samples are forwarded to an upper-level PHY module 464. The upper-level PHY module 464 together with the lower-level PHY module 462 are included in the PHY processor 316 illustrated in FIG. 3. In some embodiments, the upper-level PHY module 464 can be used to process and decode Orthogonal Frequency Division Multiplexing (OFDM) symbols, with the support of a coprocessor module, to reconstruct a full PPDU. The reconstructed PPDU is output by the upper-level PHY module 464 and subsequently processed by a MAC layer processor 466. MAC layer processor 466 is used to extract the data payload from the PPDU and provide the relevant information to the HOST layer 468 for consumption.

Figure 5:
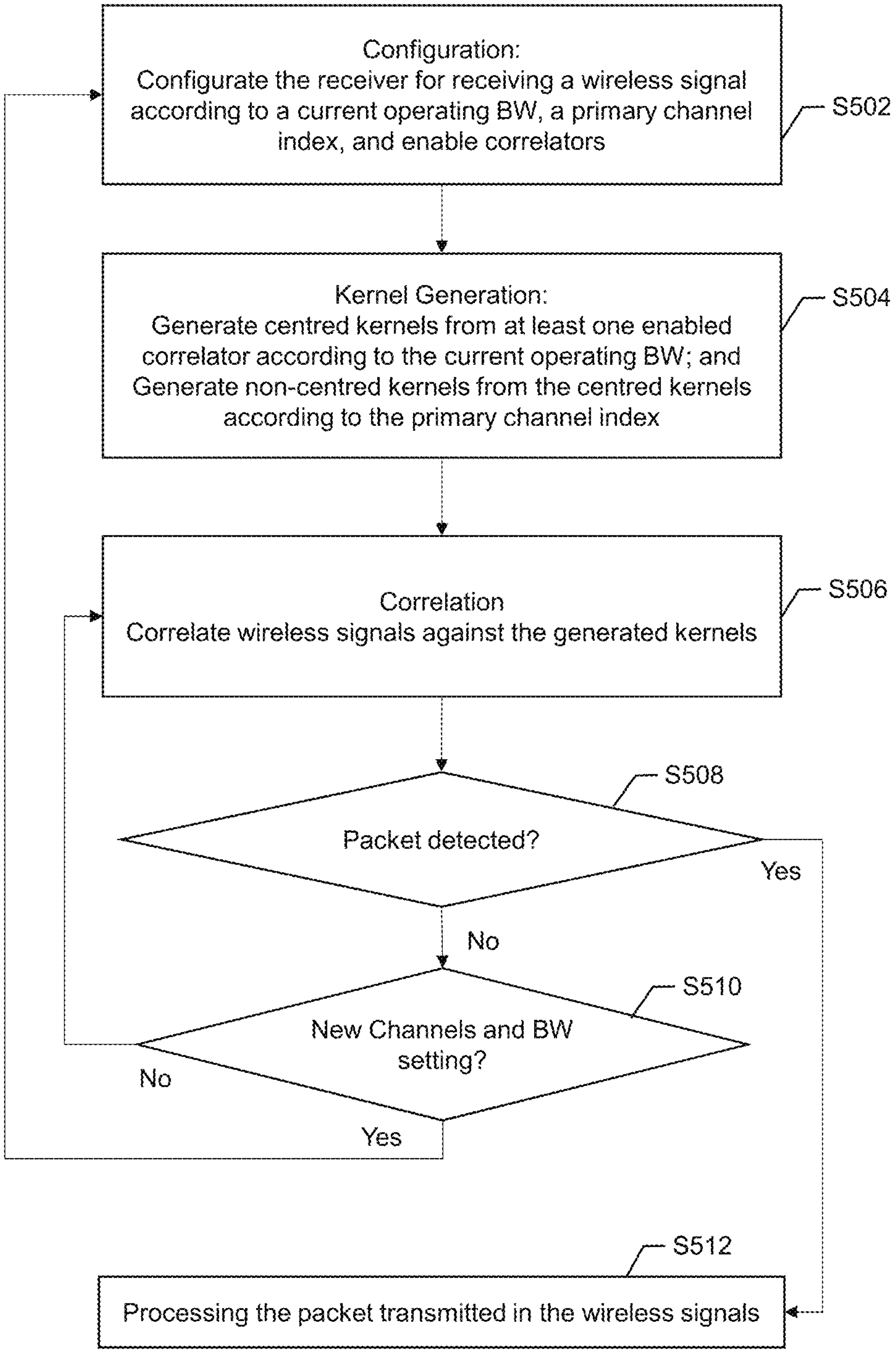
FIG. 5 is a flowchart illustrating an embodiment of packet detection method using a low-cost kernel implementation.

FIG. 5 is a flowchart illustrating a packet detection method performed by a wireless communication device according to an embodiment of the present invention. The wireless communication device wirelessly connecting to a wireless network configurates the receiver for receiving a wireless signal according to a current operating bandwidth, a primary channel index, and enables one or more stored correlators in step S502. In step S504, the wireless communication device generates one or more centred kernels from the stored correlators according to the current operating bandwidth and optionally generates non-centred kernels from the centred kernel(s) according to the primary channel index. For example, when the current operating bandwidth is 1 MHz, the wireless communication device generates a 1 in 1 centred kernel from a stored correlator corresponding to a 1 in 8 centred kernel. For the current operating bandwidth equals to 2 MHz, the wireless communication device generates a 1 in 2 centred kernel from the stored correlator corresponding to the 1 in 8 centred kernel, and a 2 in 2 centred kernel from a stored correlator corresponding to a 2 in 8 centred kernel. From the generated 1 in 2 centred kernel, two 1 in 2 non-centred kernels are generated. When the current operating bandwidth is 4 MHz, the wireless communication device generates a 1 in 4 centred kernel from a stored correlator corresponding to the 1 in 8 centred kernel, and a 2 in 4 centred kernel from a stored correlator corresponding to the 2 in 8 centred kernel, and a 4 in 4 centred kernel from a stored correlator corresponding to a 4 in 8 centred kernel. The wireless communication device then generates four 1 in 4 non-centred kernels from the 1 in 4 centred kernel, two 2 in 4 non-centred kernel from the 2 in 4 centred kernel. In case when the current operating bandwidth is 8 MHz, the wireless communication device generates four centred kernels including 1 in 8, 2 in 8, 4 in 8, and 8 in 8 centred kernels from the four stored correlators, then generates non-centred kernels from the 1 in 8, 2 in 8, and 4 in 8 centred kernels. For example, the generated non-centred kernels include eight 1 MHz kernels (1LLL, 1LLH, 1LHL, 1LHH, 1HLL, 1HLH, 1HHL, and 1HHH) derived from the 1 in 8 MHz centred kernel, four 2 MHz kernels (2LL, 2LH, 2HL, and 2HH) derived from the 2 in 8 MHz centred kernel, and two 4 MHz kernels (4L and 4H) derived from the 4 in 8 MHz centred kernel. In step S506, the wireless communication device correlates the received wireless signal with the generated kernels, for example, 1 centred kernel when the current operating bandwidth is 1 MHz, 2 non-centred kernels and 1 centred kernel when the current operating bandwidth is 2 MHz, 6 non-centred kernels and 1 centred kernel when the current operating bandwidth is 4 MHz, or 14 non-centred kernels and 1 centred kernel when the current operating bandwidth is 8 MHz. In some embodiments, the wireless communication device does not monitor all primary and secondary channels for large operating bandwidth, in order to reduce the number of kernels for correlation. For example, the wireless communication device only generates kernels for listening to the primary channels, or it generates kernels for the primary channels with a selection of secondary channels. In step S508, the wireless communication device determines whether a packet is successfully detected according to the packet detection result of the correlation operation, and it processes the packet transmitted in the wireless signal in step S512 if the packet is successfully detected, otherwise it checks if there is any change in channel and bandwidth setting in step S510. Upon acknowledging there are new channels or bandwidth settings in step S510, the wireless communication device configurates the receiver in step S502 to continuously monitor the wireless medium to identify any valid packet present in the wireless signal. Otherwise, the wireless communication device continues to perform correlation with the same set of kernels in step S506. In step S512, the wireless communication device moves to search for LTF upon successfully detecting the STF, and if LTF is identified, the wireless communication device decodes the wireless signal to extract the PHY header and payload at the PHY layer, verifies at the MAC layer, and processes the packet content. The wireless communication device may discard the received wireless signal when the packet detection result does not indicate a packet is successfully detected.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims. Well-known circuits, processes, algorithms, structures, and techniques may be shown without unnecessary detail to avoid obscuring the aspects.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks may be stored in a computer-readable or machine-readable medium. The computer-readable medium may comprise memory or data storage media, such as Random-Access Memory (RAM) such as Synchronous Dynamic Random-Access Memory (SDRAM), Read-Only Memory (ROM), Non-Volatile Random-Access Memory (NVRAM), Electrically Erasable Programmable Read-Only Memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves. The program code may be executed by a processor, which may include one or more processors, such as one or more Digital Signal Processors (DSPs), general purpose microprocessors, an Application Specific Integrated Circuits (ASICs), Field Programmable Logic Arrays (FPGAs), or other equivalent integrated or discrete logic circuitry. Such a processor may be configured to perform any of the steps described in this disclosure. A general-purpose processor may be a microprocessor; alternatively, the processor may be any conventional processor, controller, microcontroller, or state machine. A processor may also be implemented as a combination of computing devices.

To clearly illustrate the interchangeability of hardware and software, various illustrative components, blocks, modules, engines, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present application.

What is claimed is:

1. A packet detection method performed by a wireless communication device communicating in a wireless network, the method comprising:

configuring the wireless communication device to receive a wireless signal according to a current operating bandwidth and a primary channel index;

generating at least a centred kernel from at least a stored correlator according to the current operating bandwidth;

generating non-centred kernels from the centred kernel by frequency shifting according to the current operating bandwidth and the primary channel index;

correlating at least a portion of the received wireless signal with one or a combination of the generated centred and non-centred kernels to determine a packet detection result; and processing the received wireless signal according to the packet detection result.

2. The packet detection method of claim 1, wherein the store correlator comprises one or a combination of a 1 in 8 centred kernel, a 2 in 8 centred kernel, a 4 in 8 centred kernel, and an 8 in 8 centred kernel.

3. The packet detection method of claim 2, wherein generating the centred kernel comprises downsampling the 1 in 8 centred kernel to generate a 1 in 4 centred kernel, a 1 in 2centred kernel, or a 1 in 1 centred kernel, or downsampling the 2 in 8 centred kernel to generate a 2 in 4 centred kernel or a 2 in 2 centred kernel, or downsampling the 4 in 8 centred kernel to generate a 4 in 4 centred kernel.

4. The packet detection method of claim 2, wherein the current operating bandwidth is 1 MHz, and generating at least a centred kernel comprises downsampling the 1 in 8centred kernel to generate a 1 in 1 centred kernel, wherein the packet detection result is determined by correlating at least a portion of the received wireless signal with the 1 in 1 centred kernel.

5. The packet detection method of claim 2, wherein the current operating bandwidth is 2 MHz, generating at least a centred kernel comprises downsampling the 1 in 8centred kernel and downsampling the 2 in 8 centred kernel to generate a 1 in 2 centred kernel and a 2 in 2 centred kernel, and generating non-centred kernels comprises frequency shifting the 1 in 2 centred kernel to generate two 1 in 2 non-centred kernels, wherein the packet detection result is determined by correlating at least a portion of the received wireless signal with the two 1 in 2non-centred kernels and the 2 in 2 centred kernel.

6. The packet detection method of claim 2, wherein the current operating bandwidth is 4 MHz, generating at least a centred kernel comprises downsampling the 1 in 8centred kernel, 2 in 8 centred kernel, and 4 in 8 centred kernel to generate a 1 in 4 centred kernel, 2 in 4 centred kernel, and 4 in 4 centred kernel, and generating non-centred kernels comprises frequency shifting the 1 in 4 centred kernel and 2 in 4 centred kernel to generate four 1 in 4 non- centred kernels and two 2 in 4 non-centred kernels, wherein the packet detection result is determined by correlating at least a portion of the received wireless signal with the four 1 in 4non-centred kernels, two 2 in 4 non-centred kernels, and the 4 in 4 centred kernel.

7. The packet detection method of claim 2, wherein the current operating bandwidth is 8 MHZ, and the generated centred kernels comprise the 1 in 8 centred kernel, 2 in 8centred kernel, 4 in 8 centred kernel, and 8 in 8 centred kernel, wherein generating non-centred kernels comprises frequency shifting the 1 in 8 centred kernel, 2 in 8 centred kernel, and 4 in 8centred kernel to generate eight 1 in 8 non-centred kernels, four 2 in 8 non-centred kernels, and two 4 in 8 non-centred kernels, wherein the packet detection result is determined by correlating at least a portion of the received wireless signal with the eight 1 in 8 non-centred kernels, four 2in 8 non-centred kernels, two 4 in 8 non-centred kernels, and the 8 in 8 centred kernel.

8. The packet detection method of claim 1, further comprising sampling the received wireless signal at the current operating bandwidth to generate samples of in-phase (I) and quadrature phase (Q) for packet detection.

9. The packet detection method of claim 8, wherein correlating at least a portion of the received wireless signal comprises cross correlating the samples of in-phase and quadrature phase with one or more of the generated centered and non-centred kernels according to the current operating bandwidth.

10. The packet detection method of claim 1, wherein the portion of the wireless signal comprises a Short Training Field (STF) of a Physical layer (PHY) preamble.

11. The packet detection method of claim 10, wherein processing the received wireless signal comprises performing a Long Training Field (LTF) search when the packet detection result indicates the STF is successfully detected.

12. The packet detection method of claim 1, wherein generating at least a centred kernel comprises downsampling or decimating the stored correlator.

13. The packet detection method of claim 1, wherein the stored correlator is a quantized centred kernel.

14. The packet detection method of claim 1, wherein generating non-centred kernels from the centred kernel by frequency shifting is implemented by a Look Up Table (LUT) and a counter.

15. The packet detection method of claim 14, wherein input values of the LUT represent the centred kernel, output values of the LUT represent each of the non-centred kernel, and the LUT is searched by a column index derived from the counter incremented according to the current operating bandwidth and the primary channel index.

16. A wireless communication device communicating in a wireless network, comprising:

a Radio Frequency (RF) receiver;

a processor, communicatively coupled to the RF receiver; and one or more memory banks, communicatively coupled to the processor and storing processor readable codes that, when executed by the processor, are configured for;

configuring the wireless communication device to receive a wireless signal according to a current operating bandwidth and a primary channel index;

generating at least a centred kernel from at least a stored correlator according to the current operating bandwidth;

generating non-centred kernels from the centred kernel by frequency shifting according to the current operating bandwidth and the primary channel index;

correlating at least a portion of the received wireless signal with one or a combination of the generated centred and non-centred kernels to determine a packet detection result; and processing the received wireless signal according to the packet detection result.

17. The wireless communication device of claim 16, wherein the processor is configured for generating one or more centred kernels by downsampling one or more stored correlators.

18. The wireless communication device of claim 16, wherein the one or more memory banks store a Look Up Table (LUT), the LUT maps input values to output values based on the primary channel index for frequency shifting, wherein the processor is configured for generating the non-centred kernels by obtaining input in-phase (I) and quadrature phase (Q) combinations corresponding to the centred kernel, and searching the LUT to derive output I and Q combinations of the non-centred kernel.

19. The wireless communication device of claim 18, wherein the LUT is simplified by incorporating logic for transforming input I and Q combinations to output I and Q combinations corresponding to one or more predetermined phases, and only storing output I and Q combinations corresponding to phases not belong to the one or more predetermined phases, wherein the processor is configured for deriving the output I and Q combinations of the non-centred kernel according to input I and Q combinations of the centred kernel based on the incorporated logic.

20. The wireless communication device of claim 18, wherein the LUT is searched by a column index derived from a counter incremented according to the current operating bandwidth and the primary channel index.

* * * * *